April 13, 1954     J. E. WEILER ET AL     2,675,298
HYDRAZINE MANUFACTURE
Filed March 25, 1950
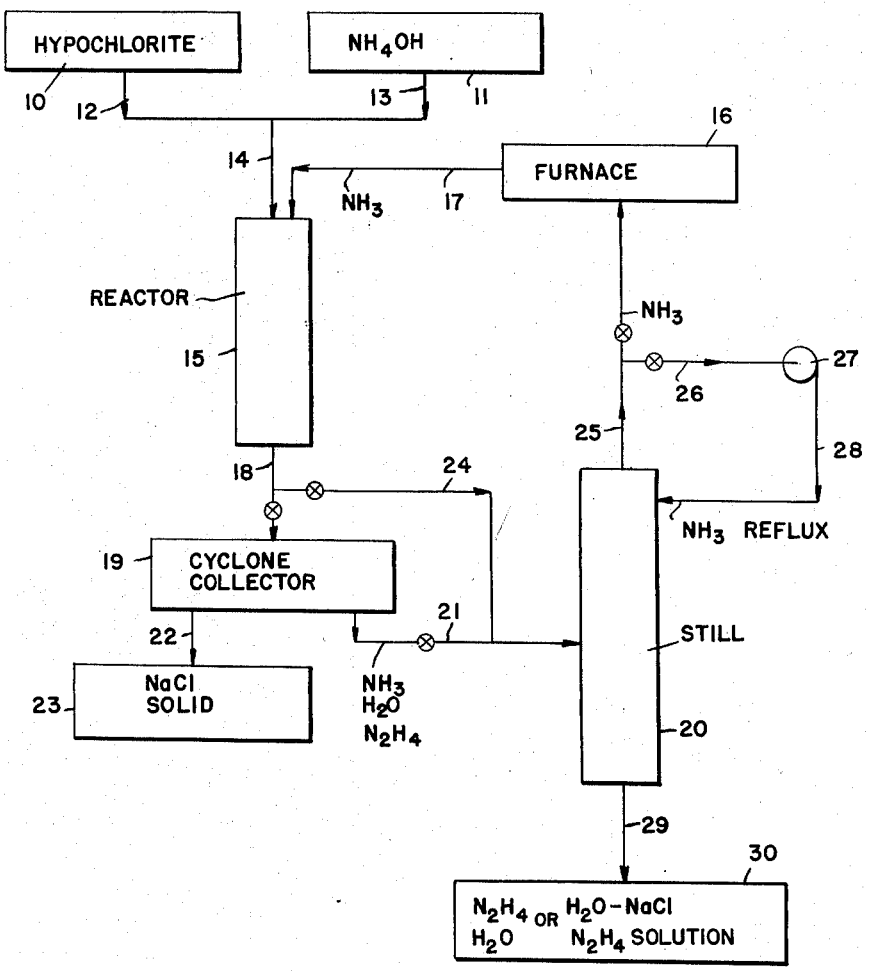
INVENTORS
JOHN E. WEILER
JOSEPH F. WEILER
BY
Adams, Forward and McLean
ATTORNEYS

UNITED STATES PATENT OFFICE 2,675,298

HYDRAZINE MANUFACTURE

John E. Weiler, Niagara Falls, and Joseph F. Weiler, Lewiston, N. Y., assignors to Mathieson Chemical Corporation, a corporation of Virginia Application March 25, 1950, Serial No. 151,884

3 Claims. (Cl. 23—190)

This invention relates to the manufacture of hydrazine and its salts by a novel improvement in the well known Raschig synthesis. It relates more particularly to a mixed phase reaction as contrasted with the conventional homogeneous aqueous phase reaction.

The Raschig synthesis of hydrazine by oxidation of ammonia by hypochlorite is the present commercial production method of choice, but suffers from a number of disadvantages including low yields, high capital investment and high power consumption necessary in the recompression of large amounts of ammonia. In the Raschig synthesis, caustic is chlorinated to form a solution of sodium hypochlorite and, when chlorination is almost complete, liquid or gaseous ammonia is dissolved in the reaction mixture to produce hydrazine.

$$NaOCl + 2NH_3 \rightarrow N_2H_4 + NaCl + H_2O$$

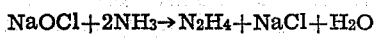

Some of the still unreacted sodium hypochlorite reacts with the hydrazine to decompose it according to the following equation:

$$2NaOCl + N_2H_4 \rightarrow N_2 + 2H_2O + 2NaCl$$

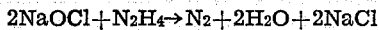

resulting in significant losses. It is difficult in the liquid phase operation to provide large quantities of ammonia in proportion to the amount of hypochlorite present with sufficient rapidity to cause the hypochlorite to react exclusively to form hydrazine. Ammonia gas dissolves readily in the aqueous medium but it is impossible by this means to provide ammonia fast enough to prevent the side reaction of hypochlorite and hydrazine resulting in the oxidation of the latter. Large proportions of ammonia can be added quickly in the form of liquid ammonia but this reduces the temperature of the reaction mixture so markedly that the synthesis reaction becomes very slow and yields are very poor. The cost of recovering, recompressing and reliquefying the large excess of ammonia required are disadvantageous. When the solution is gradually warmed, the decomposition reaction occurs as readily as the synthesis reaction.

It is believed that the synthesis reaction proceeds through chloramine as an intermediate which is formed according to the reaction:

$$NaOCl + NH_3 \rightarrow NH_2Cl + NaOH$$

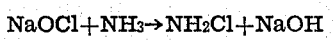

The chloramine then reacts with additional ammonia to form hydrazine and ammonium chloride:

$$NH_2Cl + 2NH_3 \rightarrow N_2H_4 + NH_4Cl$$

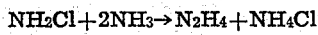

The caustic present liberates the ammonia:

$$NaOH + NH_4Cl \rightarrow NaCl + NH_3$$

We have found it advantageous to separate the two principal steps of the synthesis reaction and to conduct each under conditions peculiarly appropriate to it. We first prepare the chloramine in the cold under such conditions that little or no hydrazine is formed and then react the chloramine very rapidly in the absence of hypochlorite and in the presence of excess ammonia gas to form hydrazine. The cold solution of chloramine is sprayed into a large volume of hot ammonia gas so that the temperature of the droplets is quickly raised to reaction temperature and so that a large excess of ammonia is provided, thus favoring the synthesis reaction. The high temperature and rapid and thorough mixing obtained in the gas phase completes the hydrazine synthesis reaction in less than one second, completely using up the chloramine before it can react with and oxidize the hydrazine.

In the preparation of the chloramine solution, we admix a hypochlorite solution with aqua ammonia, keeping the temperature in the range of 0–20° C. and preferably in the lower portion of this range in order to inhibit premature reduction of the chloramine. In the cold, chloramine is rapidly formed accompanied by little or no hydrazine. As in the Raschig synthesis the proportions are such as to yield a solution about molar in chloramine but it is a feature of my process that stronger solutions may advantageously be used. An ammonia concentration of about 20% is usual although more or less concentrated solutions may be used.

The chloramine solution also contains about 0.2 to 1% of animal glue based on the volume of the reaction mixture. Less glue causes decreased yields. Much more than 0.2% seems to have little additional favorable effect. The glue is not essential for chloramine formation, but its use in the hydrazine synthesis step is highly advantageous. It is more convenient to introduce the glue in the chloramine solution than with the ammonia gas.

The cold chloramine solution is sprayed into a reactor with a large excess of hot ammonia gas containing sufficient sensible heat to raise the temperature of the droplets to reaction temperature (i. e. 60–140° C.), and advantageously in addition to evaporate the resulting hydrazine and water into the vapor phase, leaving the salt suspended as fine particles in the gas stream. The necessary temperature of the gas will depend on the proportions of solution to gas. The temperature of the ammonia gas, however, should not be substantially over about 650° C. in order to avoid losses by the decomposition of ammonia into nitrogen and hydrogen. We use at least 10 moles of ammonia gas per mole of sodium hypochlorite and we prefer to use about 20 to 30 moles per mole. More ammonia appears to be unnecessary and less may result in somewhat reduced yields. More or less of the products will be in the solid phase depending on the temperature of the ammonia gas and of the final mixture. Thus we may operate with a high enough excess of high temperature ammonia to produce a reactor temperature above the boiling point of water so that the only solid formed is salt and gaseous ammonia, hydrazine and steam are separated and handled in vapor phase. Alternatively, we may operate for a lower reactor temperature so that the reaction mixture is recovered and handled in liquid phase as an aqueous solution of hydrazine containing salt.

Any suitable apparatus may be used to carry out the process, but we prefer to use an apparatus similar to a spray dryer in which the liquid may be introduced through sprays at the top concurrent to a flow of ammonia gas suitably preheated. For the removal of solids, we provide a conventional collecting device for finely divided materials, for example, a cyclone collector in which the solids are removed and from which the vapors are passed to a fractionating system.

In vapor phase operation, the final temperature of the mixture is above the boiling point of water and hydrazine but below the decomposition point of hydrazine and its salts, e. g. about 120–140° C. In this case, the only solid formed and removed by the cyclone collector will be sodium chloride which may be separated and discarded. Gaseous ammonia, hydrazine and steam are suitably charged to a fractionating column from which anhydrous ammonia is removed overhead and recycled to the preheating furnace. Aqueous hydrazine is recovered as bottoms from the fractionating column and may be further fractionated or otherwise treated as described to recover more concentrated hydrazine, anhydrous hydrazine or hydrazine salts. Alternatively the dilute aqueous hydrazine may be charged to an absorber and converted into hydrazine salts or anhydrous hydrazine as described in the co-pending applications, Serial Nos. 781,644 and 781,645, filed October 23, 1947, of John E. Weiler.

In liquid phase operation the temperature of the final mixture is somewhat lower, e. g. about 60° C. to near the boiling point of water. Sufficient water or steam, atmospheric or superheated, may be introduced into the reactor or the reaction mixture after withdrawal from the reactor so that upon charging to a fractionating column ammonia may be removed overhead for recycle to the preheating furnace and an aqueous solution of hydrazine containing chloride may be removed as bottoms. The necessity of cyclone dust collectors are avoided and the hydrazine is recovered readily from the aqueous salt solution.

Our invention will be further illustrated by reference to the accompanying drawing which illustrates conventionally a flow plan of the major process steps. In the drawing the sodium hypochlorite solution is made up in tank 10 and ammonium hydroxide is supplied from tank 11. Chloramine is produced by passing solution from tanks 10 and 11, respectively, through lines 12 and 13 into common mixing line 14. The mixing line 14 may be cooled externally and a chamber may be provided. The cold chloramine solution is introduced by spraying into an atmosphere of hot gaseous ammonia in reactor 15. The ammonia gas is preheated in furnace 16 which may be a fired tubular heater and is introduced to reactor 15 through line 17. The reaction mixture is withdrawn through line 18, and if the reaction mixture is maintained in the vapor phase, it is passed through cyclone collector 19. The vapor stream is passed from cyclone separator 19 to fractionating still 20 by means of line 21. Solids dropped out in the cyclone are removed by line 22 to a solids cooling and disposing system 23. If the reaction mixture is condensed to liquid phase, it is removed through lines 18 and 24 directly to the fractionating still 20. In the still, ammonia is taken overhead through line 25 and an aqueous hydrazine solution or an aqueous solution containing salt is removed as bottoms through line 29 to concentrating system 30. Ammonia taken overhead through line 25 is recycled to the reactor 15 by passage through furnace 16. The appropriate amount of reflux for control of the fractionating still may be taken from the overhead as indicated by line 26, compressor 27 and reflux return line 28.

It will be seen that my process affords large savings in capital investment since the process does not require the use of liquid ammonia except in relatively small amounts as reflux in the fractionating system. Gaseous ammonia is recirculated by fans with only small pressure differences. Only about half the power is required in our process compared with the conventional process even when using four times as much ammonia per cycle due to the saving in compression and liquefaction of ammonia. Improved yields are provided at reduced capital and operating costs.

The principles of our invention will be further illustrated in the following examples, although the specific proportions and conditions suggested are not intended to be limiting.

*Example I*

A sodium hypochlorite solution containing one pound per gallon of available chlorine is charged at the rate of 36 gallons per hour to a mixing tube together with 72 gallons per hour of 20% aqueous ammonia (see Figure No. 1). The mixed solutions at a temperature of 0° C. pass to a spray dryer to which is supplied 1500 pounds per hour of anhydrous ammonia gas at a temperature of 650° C. All of the charged materials and their reaction products except for sodium chloride remain in the vapor phase at a resultant temperature of 120° C. At this temperature the salt is suspended in the gas stream. The temperature is reduced to 93° C. and the salt dissolves in the liquid phase formed. The mixture is charged at that temperature to a fractionating column containing steam coils located in the bottom of the column to provide heat. A residual solution consisting of 15.6 pounds per hour of hydrazine, representing a 95% yield, 740 pounds per hour of water and 61 pounds per hour of salt is charged to an evaporator. Water (98%) and hydrazine (2%) passes to an absorber and the residual salt is discarded. Overhead from the fractionating column, the stream of anhydrous ammonia is divided and 200 pounds per hour is compressed, liquefied and returned to the top of the column as reflux. The other stream is picked up by a fan at a temperature of −30° C. and blown through a gas-heated furnace where its temperature is raised to 650° C. for return to the spray dryer.

*Example II*

The spray-dried mixture of Example I may be passed at a temperature of 120° C. to a cyclone collector and the suspended salt removed from the other products. These are passed as vapors at a temperature of 105° C. to the fractionating column. Under these conditions the residual liquid comprises only hydrazine and water which is suitably passed to an absorber.

We claim:

1. In the manufacture of hydrazine by oxidation of ammonia with hypochlorite the steps of preparing an aqueous solution of chloramine free from hypochlorite and having a temperature of 0°–20° C., spraying the chloramine solution into a reaction zone containing a stoichiometric excess of hot ammonia gas not substantially over 650° C. in temperature, said ammonia gas containing sufficient sensible heat to raise the temperature of the sprayed solution to the approximate range of 60°–140° C. rapidly to favor the hydrazine synthesis reaction, separating the reaction mixture from the reaction zone and recovering hydrazine from the reaction mixture.

2. The process of claim 1 in which the temperature of the sprayed chloramine solution is raised by the sensible heat of the hot ammonia gas to the approximate range of 60° C. to the boiling point of water.

3. The process of claim 1 in which the temperature of the sprayed chloramine solution is raised by the sensible heat of the hot ammonia gas to the approximate range of the boiling point of water to 140° C.

References Cited in the file of this patent

UNITED STATES PATENTS

| Number | Name | Date |
|---|---|---|
| 1,480,166 | Joyner | Jan. 8, 1924 |

FOREIGN PATENTS

| Number | Country | Date |
|---|---|---|
| 22,957 | Great Britain | 1907 |
| 139 | Great Britain | 1908 |

OTHER REFERENCES

J. W. Mellor's "A Comprehensive Treatise on Inorganic and Theoretical Chemistry," vol. 8, page 604. Longmans, Green & Co., N. Y., publishers.

Ephraim's "Inorganic Chemistry," page 653, fourth edition (1943), Nordeman Publishing Co., Inc., N. Y., publishers.